(12) United States Patent
Tu

(10) Patent No.: US 7,620,840 B2
(45) Date of Patent: Nov. 17, 2009

(54) TRANSACTIONAL FLOW MANAGEMENT INTERRUPT DEBUG ARCHITECTURE

(75) Inventor: Steven Tu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 11/648,112

(22) Filed: Dec. 29, 2006

(65) Prior Publication Data

US 2008/0162757 A1     Jul. 3, 2008

(51) Int. Cl.
*G06F 11/00* (2006.01)

(52) U.S. Cl. .............................. 714/2; 714/25; 714/30; 714/43

(58) Field of Classification Search ............. 714/2, 714/25, 30, 34, 35, 37, 43, 45; 710/107
See application file for complete search history.

(56) References Cited

U.S. PATENT DOCUMENTS

| | | | |
|---|---|---|---|
| 6,289,473 B1 * | 9/2001 | Takase | 714/35 |
| 6,918,058 B2 * | 7/2005 | Miura et al. | 714/30 |
| 7,055,139 B2 * | 5/2006 | Balle et al. | 714/E11.21 |
| 7,124,404 B1 * | 10/2006 | Bebout et al. | 714/E11.21 |
| 2005/0210327 A1 * | 9/2005 | Allue et al. | 714/25 |
| 2007/0006042 A1 * | 1/2007 | Beukema et al. | 714/38 |
| 2007/0105607 A1 * | 5/2007 | Russell et al. | 463/1 |
| 2007/0139421 A1 * | 6/2007 | Chen et al. | 345/501 |

* cited by examiner

*Primary Examiner*—Christopher S McCarthy
*Assistant Examiner*—Joseph D Manoskey
(74) *Attorney, Agent, or Firm*—Buckley, Maschoff & Talwalkar LLC

(57) ABSTRACT

According to some embodiments, a first bus may be monitored, via a first debug gate, the first bus being to exchange data between a first processing system and a second processing system. A second bus may also be monitored, via a second debug gate, the second bus being to exchange data between the second processing system and a third processing system. Responsive to the monitoring of at least one of the first or second buses, execution of applications, executing on at least two of the processing units, may be interrupted.

21 Claims, 6 Drawing Sheets

TRANSACTIONAL FLOW MANAGEMENT INTERRUPT DEBUG ARCHITECTURE

BACKGROUND

When debugging software applications, it may be important to interrupt execution of the application when a certain pattern is detected. For example, execution of an application might be interrupted when a particular address is transmitted via a system bus. Such an ability might, for example, help a software engineer determine why one or more pixels in a display image are corrupted.

In some cases, such as in a video processing system, a number of different processing units may execute applications that interact with each other. Moreover, the various processing units may exchange information via a number of different buses, such as system buses, memory buses, and other types of data buses. Also note that different buses may exchange information in accordance with different bus protocols. As a result, debugging these types of software applications can be a difficult and time consuming task. For example, interrupting a graphics processing unit when a particular pattern of data is detected might not let a software engineer determine the state of information in a memory unit at that exact time (e.g., because another processing unit in the system might have already overwritten the information).

DETAILED DESCRIPTION

Figure 1:
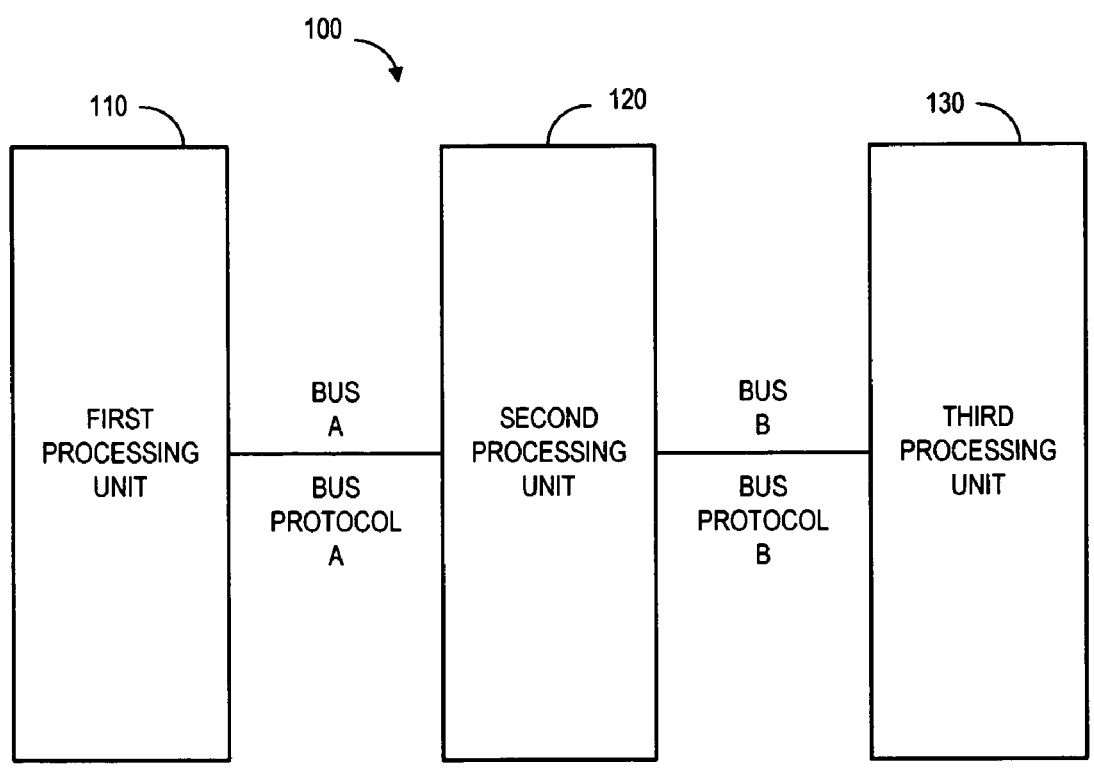
FIG. 1 is a block diagram of an apparatus.

When debugging software applications, it may be important to interrupt execution of the application when a certain pattern is detected. For example, execution of an application might be interrupted when a particular address is transmitted via a system bus. Such an ability might, for example, help a software engineer determine why one or more pixels in a display image are corrupted. In some cases, such as in a video processing system, a number of different processing units may execute applications that interact with each other. For example, FIG. 1 is a block diagram of an apparatus 100 that includes a first processing unit 110, a second processing unit 120, and a third processing unit 130.

Moreover, the various processing units 110, 120, 130 may exchange information via a number of different buses, such as system buses, memory buses, and other types of data buses. For example, FIG. 1 illustrates a first bus A to exchange information between the first processing unit 110 and the second processing unit 110. Moreover, a second bus B is provided to exchange information between the second processing unit 120 and the third processing unit 130.

Also note that different buses may exchange information in accordance with different bus protocols. For example, bus A of FIG. 1 might operate in accordance with a first bus protocol A while bus B operates in accordance with a second bus protocol B. Debugging these types of software applications and processing elements 110, 120, 130 can be a difficult and time consuming task. For example, interrupting the first processing unit 110 when a particular pattern of data is detected might not let a software engineer determine the state of information in the third processing unit 130 at that exact time (e.g., because the second processing unit 120 might have already overwritten that information).

Figure 2:
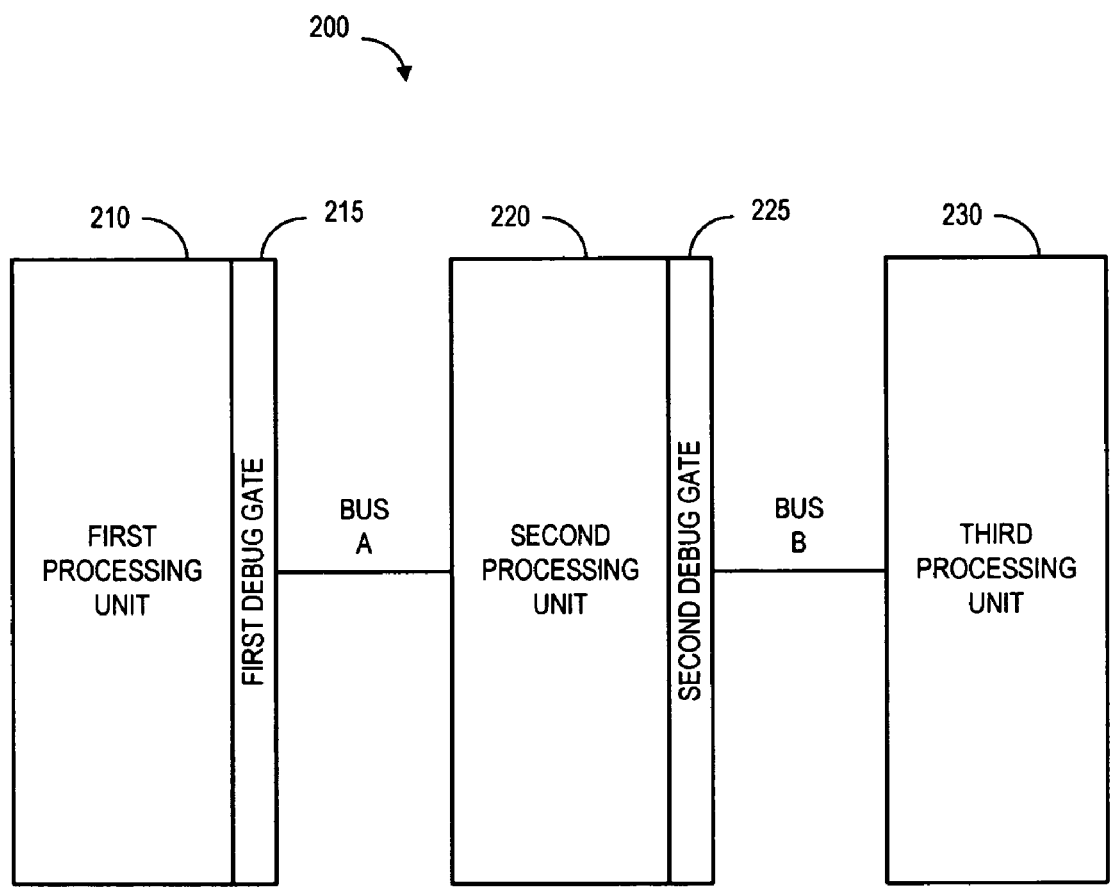
FIG. 2 is a block diagram of an apparatus according to some embodiments.

FIG. 2 is a block diagram of an apparatus 200 according to some embodiments. As before, the apparatus includes a first processing unit 210, a second processing unit 220, and a third processing unit 230. Moreover, the various processing units 210, 220, 230 may exchange information via a number of different buses, such as system buses, memory buses, and other types of data buses. For example, FIG. 2 illustrates a first bus A to exchange information between the first processing unit 210 and the second processing unit 210. Moreover, a second bus B is provided to exchange information between the second processing unit 220 and the third processing unit 230. Note that different buses may exchange information in accordance with different bus protocols. For example, bus A of FIG. 1 might operate in accordance with a first bus protocol A while bus B operates in accordance with a second bus protocol B.

According to this embodiment, a first debug gate 215 is provided between the first processing unit 110 and A bus. Moreover, a second debug gate 225 is provided between the second processing unit 220 and the second bus B. The debug gates 215, 225 might include, for example, an address matching register, an address masking register, and/or a data injection mechanism. For example, when a pattern in an address matching register matches information being transmitted via bus A, the execution of applications at one or more of the processing units 210, 220, 230 units may be interrupted. At this point, a software engineer might be able to view control flow and/or data flow information. Moreover, the software engineer might be able to inject data into one of the processing units 210, 220, 230.

Note that according to some embodiments at least two of the processing units are associated with a single System On a Chip (SOC). Moreover, the SOC may be associated with a video processing system. For example, the apparatus 200 may be associated with a digital display device, a television, a Digital Video Recorder (DVR), a game device, a Personal Computer (PC), a wireless device, and/or a set-top box.

Figure 3:
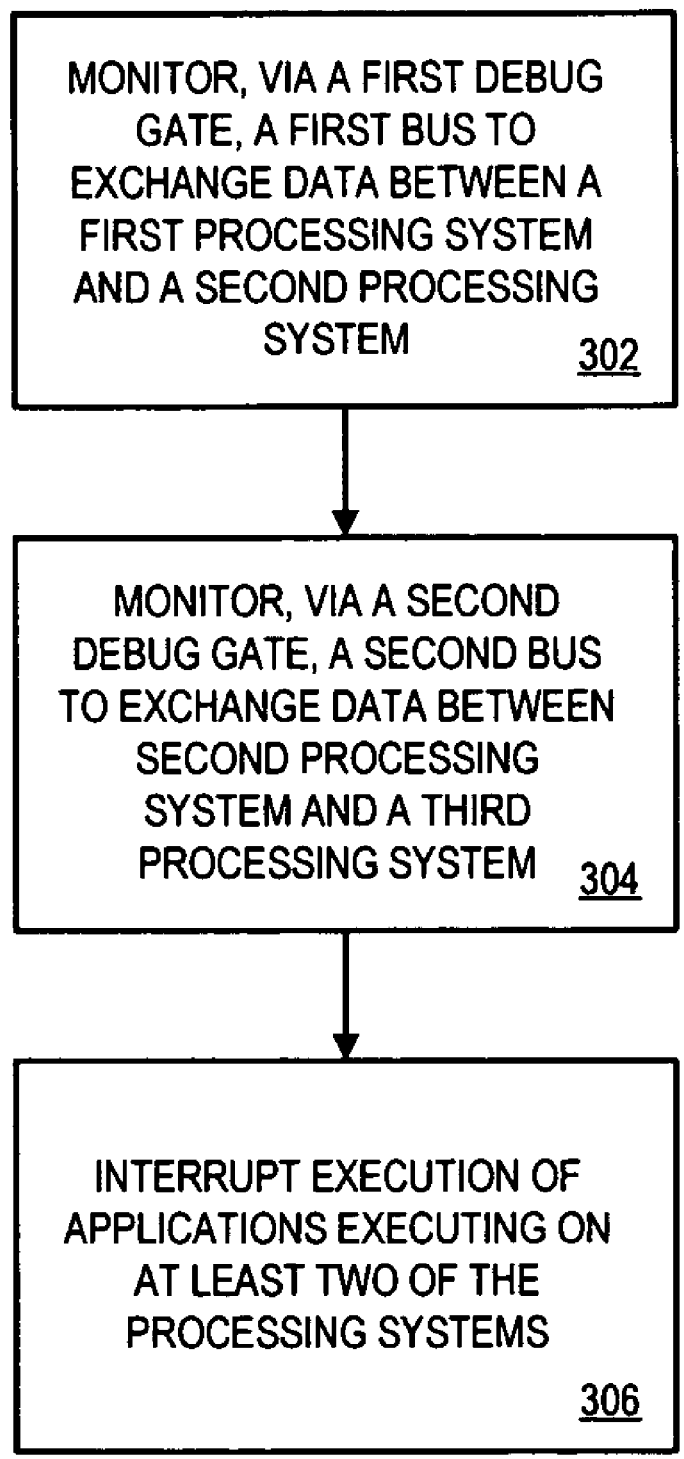
FIG. 3 is a flow diagram illustrating a method according to some embodiments.

FIG. 3 is a flow diagram illustrating a method according to some embodiments. The method may be performed, for example, by the apparatus 200 of FIG. 2. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 302, a first bus may be monitored via a first debug gate. The first bus may, for example, be to exchange data between a first processing system and a second processing system. At 304, a second bus may be monitored via a second debug gate. The second bus may, according to some embodiments, be to exchange data between the second processing system and a third processing system.

At 306, execution of applications executing on at least two of the processing units is interrupted responsive to said monitoring of at least one of the first or second buses. Note that different buses may exchange information in accordance with different bus protocols. Moreover, the interruption may be triggered by multiple matches and/or multiple debug gates (e.g., either a first pattern at the first debug gate or a second pattern at the second debug gate might trigger an interruption).

Figure 4:
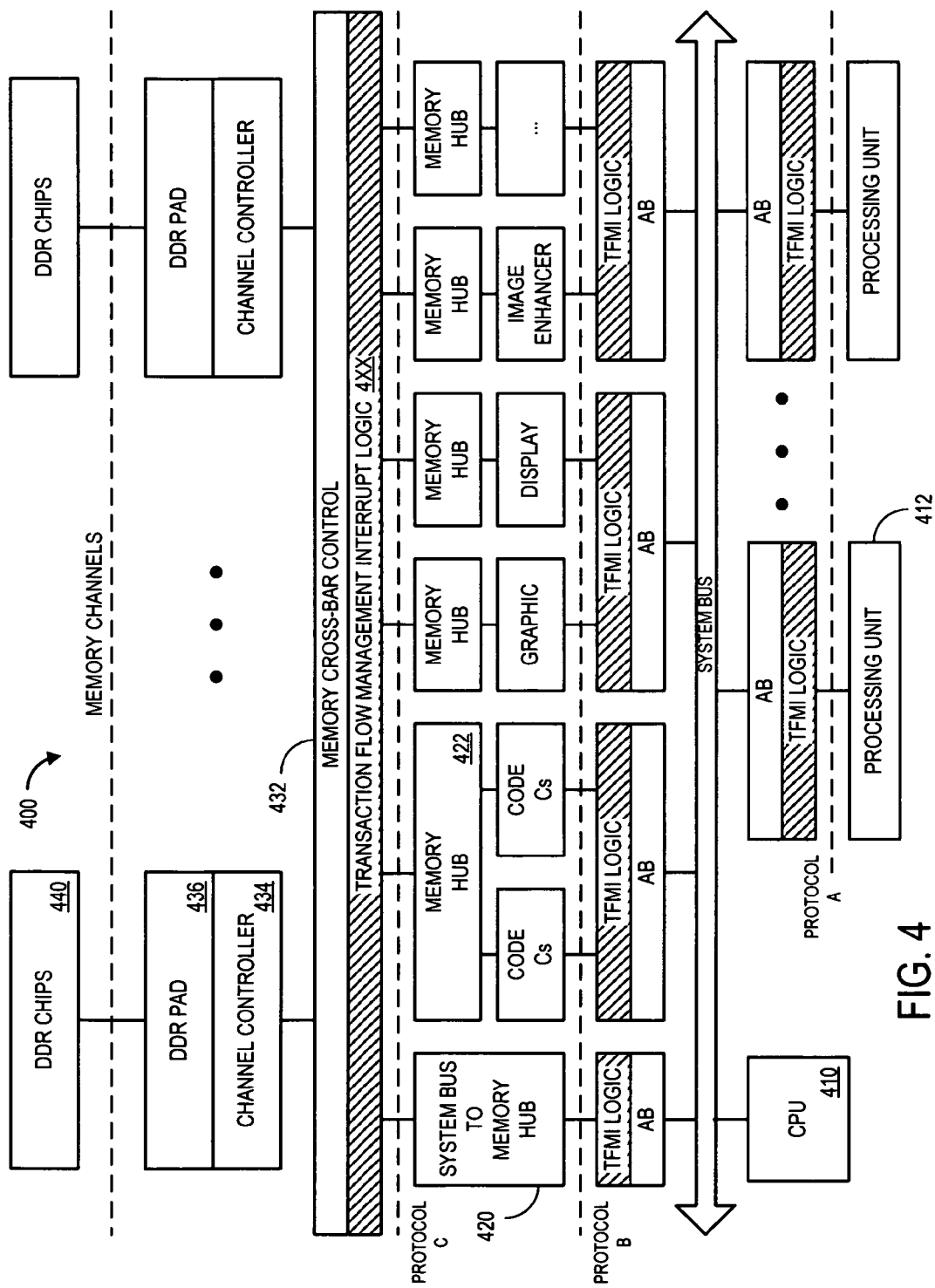
FIG. 4 is a block diagram of a video processing system according to some embodiments.

According to some embodiments, multiple debug gates may be provided for a "media player" or similar device. For example, FIG. 4 is a block diagram of a video processing system 400 according to some embodiments. The video processing system 400, might, for example, be a media player or similar device that receives image information, decode the information, and output a signal to a display device. For example, a DVR might retrieve locally stored image information, or a set-top box might receive a stream of image information from a remote device (e.g., a content provider might transmit a stream that includes high-definition image frames to the set-top box through a cable or satellite network).

The video processing system 400 might, according to some embodiments, decode image information. As used herein, information may be encoded and/or decoded in accordance with any of a number of different protocols. For example, image information may be processed in connection with International Telecommunication Union-Telecommunications Standardization Sector (ITU-T) recommendation H.264 entitled "Advanced Video Coding for Generic Audiovisual Services" (2004) or the International Organization for Standardization (ISO)/International Engineering Consortium (IEC) Motion Picture Experts Group (MPEG) standard entitled "Advanced Video Coding (Part 10)" (2004). As other examples, image information may be processed in accordance with ISO/IEC document number 14496 entitled "MPEG-4 Information Technology—Coding of Audio-Visual Objects" (2001) or the MPEG2 protocol as defined by ISO/IEC document number 13818-1 entitled "Information Technology—Generic Coding of Moving Pictures and Associated Audio Information" (2000).

According to some embodiments, video processing system 400 includes memory units that store information, such as image information. The memory units might be associated with, for example, a Dynamic Random Access Memory (DRAM) unit, a Synchronous DRAM (SDRAM) unit, and/or a Double Data Rate (DDR) SDRAM units (DDR chips 440 in FIG. 4).

The video processing system 400 also includes a number of processing units, such as a Central Processing Unit (CPU) 410, other processing units 412 and communicate via a system bus. Agent Bridges (AB) may let such processing units exchange information with other processing units, such as a system bus-to-memory hub 420 and other memory hubs 422 (e.g., associated with graphic devices, display devices, and/or image enhancers). Those processing units may in turn exchange information via other buses and/or protocols, such as a memory cross-bar control 432 which in turn can exchange information with the DDR chips 440 via a channel controller 434 and DDR pad 436.

According to some embodiments, the video processing system 400 provides SOC debug capability in a video system. It might, for example, provide observability and/or controllability for the video processing system 400 (e.g., such that individual pixel data corruption might be tracked across the system 400). According to some embodiments, Transactional Flow Management Interrupt (TFMI) logic (illustrated with cross-hatching in FIG. 4) can be provided between various processing units and/or buses. The TFMI logic might, for example, provide a flow control capability to "stall" or "pause" control flow and/or data flow. Such an approach might, for example, create an investigation window to be used by debug software to examine system states. It might also allow full resume from where execution was "stalled" or "paused." Using the TFMI logic along with handler software might also provide valuable system 400 debug features such as, system single stepping, a video system traffic watcher, and/or control/data flow injection. These features might provide a substantial system 400 level debug capability to let software engineers examine difficult video codec errors and/or other image processing engine flaws.

According to some embodiments, the TFMI logic may be implemented at several interface ports within a memory subsystem. The TFMI logic might comprise, for example, a set of TFMI gates. The TFMI gates might be implemented for example, at a number of Multi-port, Multi-channel Memory Controller (MMMC) ports, and might control memory traffic to the MMMC. The TFMI gates might also be implemented at Agent Bridge (AB) ports control memory traffic initiated by master agents to ABs.

According to some embodiments, the TFMI logic may provide data transaction flow break point to memory (e.g., to the DDR chips 44). For example, transaction requests to a MMMC port might be considered data transactions that are issued by data processing engines or device agents or processors. The TFMI gates at each MMMC port might provide address matching/mask registers for a data transaction break point for various addresses and/or address regions.

According to other embodiments, the TFMI logic may provide a control/data transaction flow break point to the system bus and/or memory. In this case, transaction requests to ABs might be considered control/data transactions that are issued by data processing engines and/or Input Output (IO) agents. Note that the TFMI gates at ABs might provide address matching/mask registers for control/data transaction break point (and, as before, may do so for various addresses and/or address regions). Some embodiments might include TFMI logic that provides transaction break point matching and masking capability. In this case, the address and address mask registers could provide a flexible control range for setting up break points (e.g., from a single byte address up to a 4-GB memory range).

The TFMI logic might also provide a "double gate" control mechanism for data flow. For example, the "double gates" mechanism could provide a debug data feed capability for added control over data to be read from (or written into) the DDR chips 440. Such an approach might, for example, enable a "data injection" feature to data processing units.

According to some embodiments, the TFMI logic may provide transaction counter control for a transaction flow. For example, a transaction counter in the TFMI gates could provide various ranges of break frequency to enable a "slow forwarding" feature in addition to single stepping. According to yet other embodiments, the TFMI logic may provide transaction flow management interrupt control. In this case, the TFMI logic might be programmed and directed to the control processor via a debug break pin. Such an approach might, for example, let the CPU 410 immediately stop execution of existing programs and branch to a debug handler to interrogate system logic states for any given TFMI event. One example of pseudo-code associated with such an approach is provided here:

```
// setting up TFMI gate at AB0
// Enable TFMI, enable all ports, enable XSI issue, enable interrupt, set TFMI counter to 1
LDR R3, #AB0_CONTROL_REG_VALUE
```

-continued

```
STR R3,<AB0_CONTROL_REG>
.....
Debug handler:
    // Saving machine states
    ....
    // check all TFMI gates status
    ....
    LDR R2 <MCU0_CONTROL_REG>
    AND R3,R2, #INTR_STATUS_BITS
    CMP R3, #0
    B #TFMI_HANDLER
    ...
    ...
LDR R3, <AB0_CONTROL_REG>
    AND R3,R2, #INTR_STATUS_BITS
    CMP R3, #0
    B # TFMI_HANDLER
        ...
        ...
        // Return to program
        // restoring machine states
        ...
        // reset TFMI counter to 1, and write this last before branch
to normal program.
            LDR R3, #AB0_CONTROL_REG_VALUE
            STR R3, <AB0_CONTROL_REG>
            // return
            STR PC, Rxx
            B PC
    TFMI_HANDLER:
        // read other registers for the target debug unit
        LDR R4, <Debug unit register_xxx>
        .....
        // store debug unit states/registers to memory
        STR R4, <TFMI_Memory_Buffer>
        ...
...
        // enter emulation mode under certain conditions...
        ...
```

According to still other embodiments, the TFMI logic may provide a transaction flow watcher. In this case, one or more the transaction flow watchers could be placed at MMMC and AB ports and be programmed to capture address and/or address attributes for requests going through those ports. The transaction request watcher might, for example, provide an observation capability at multiple ports within a memory subsystem enabling in-depth analysis of system 400 traffic.

Such features might, according to some embodiments, provide a method to intercept the video processing system 400 at interesting points of execution, and let a software engineer investigate the system 400 states at the point of an error (or other interesting point of the execution). Because debugging errors in video streams or decoded frames can be difficult to detect and investigate, such embodiments may provide an advantageous tool to let a software engineer, system programmer, and/or silicon designer determine an error condition and when it occurred, and provide substantial capabilities to interrogate the system hardware for possible cause of such a corruption.

Figure 5:
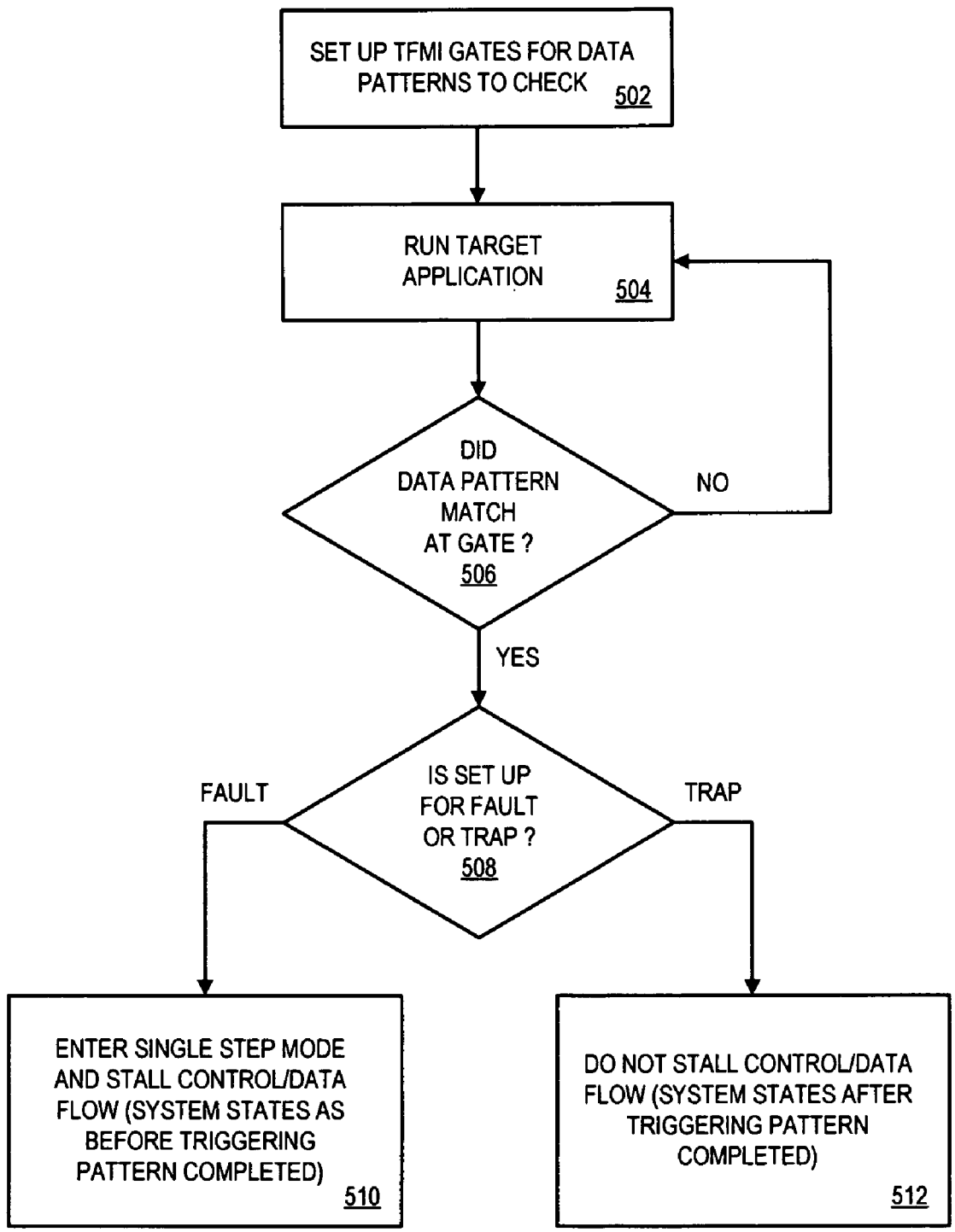
FIG. 5 is a flow diagram illustrating a method according to some embodiments.

In some cases, it may be helpful to investigate system 400 conditions immediately before a condition occurring. In other cases, it might be better to investigate system 400 conditions immediately prior to a condition occurring. FIG. 5 is a flow diagram illustrating a method according to some embodiments. At 502, TFMI gates are set up with data patterns that should be checked. At 504, a target application is executed. The application continues to execute until the data pattern is matched at the TFMI gate at 506.

If the TFMI is set up to provide a "fault" interrupt at 506, a single step mode may be entered and the control/data flow may be stalled at 510. In this way, the system states may remain as they were before the triggering pattern completed. If the TFMI is set up to provide a "trap" interrupt at 506, the control/data flow might not be stalled at 512. In this way, the system states may reflect conditions after the triggering pattern completed.

Figure 6:
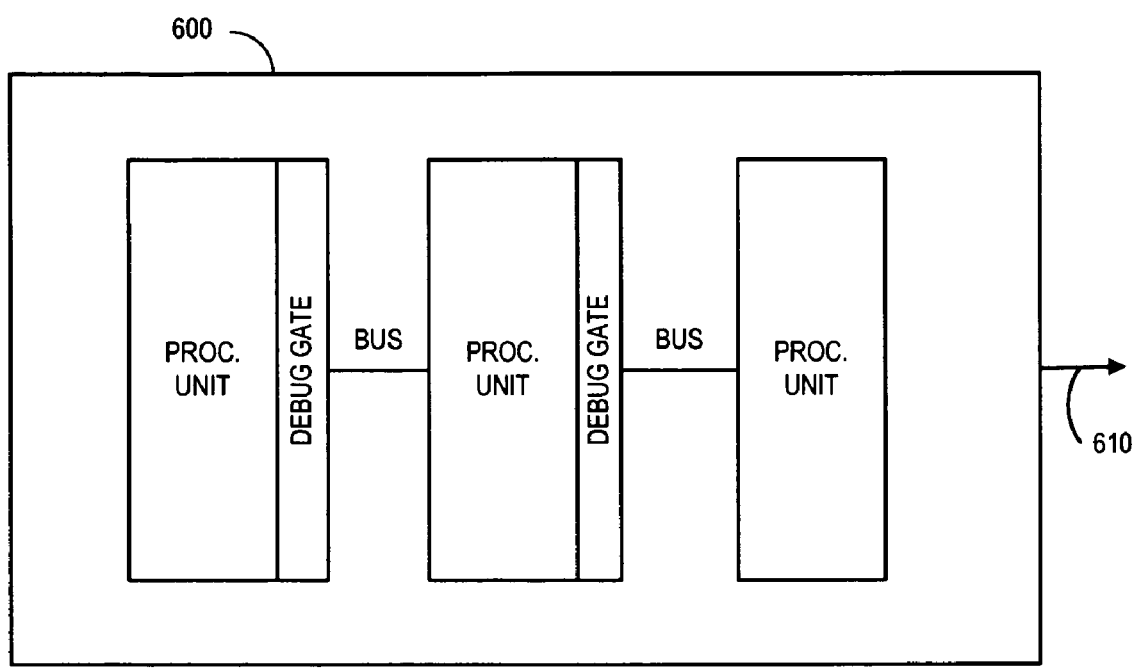
FIG. 6 is a block diagram of a system according to some embodiments.

FIG. 6 is a block diagram of a system 600 according to some embodiments. The system 600 might be associated with, for example, a digital display device, a television such as a High Definition Television (HDTV) unit, a DVR, a game console, a PC or laptop computer, a wireless device, and/or a set-top box (e.g., a cable or satellite decoder). The system 600 may operate in accordance with any of the embodiments described herein. For example, the system 600 may include a general processing unit, a graphics processing unit, and/or a memory cross-bar control unit. The system might further include a first bus to exchange information between the central processing unit and the graphics processing unit (the first bus operating in accordance with a first bus protocol) and a second bus to exchange information between the graphics processing unit and the memory cross-bar control unit (operating in accordance with a second bus protocol). According to some embodiments, the system further includes a number of TFMI gates between the processing units and/or buses. Moreover, according to some embodiments, the system 600 generates information that is provided to a display device via a digital output 610.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although particular image processing protocols and networks have been used herein as examples (e.g., MPEG and H.264), embodiments may be used in connection any other type of image processing protocols or networks, such as Digital Terrestrial Television Broadcasting (DTTB) and Community Access Television (CATV) systems.

Similarly, although some embodiments have been describe with respect to media players and/or decoders, embodiments may be associated with any type of image processing system, including media servers and/or encoders.

The several embodiments described herein are solely for the purpose of illustration. Persons skilled in the art will recognize from this description other embodiments may be practiced with modifications and alterations limited only by the claims.

What is claimed is:

1. A method, comprising:
    monitoring, via a first debug gate, a first bus to exchange data between a first processing system and a second processing system;
    monitoring, via a second debug gate, a second bus to exchange data between the second processing system and a third processing system, wherein at least one of said monitorings is associated with a transaction flow watcher; and
    responsive to said monitoring of at least one of the first or second buses, interrupting execution of applications executing on at least two of the processing units.

2. The method of claim 1, wherein at least two of the processing units are associated with a single system on a chip.

3. The method of claim 2, wherein the system on a chip is associated with a video processing system.

4. The method of claim 1, wherein said processing unit is associated with at least one of: (i) a digital display device, (ii) a television, (iii) a digital video recorder, (iv) a game device, (v) a personal computer, (vi) a wireless device, or (vii) a set-top box.

5. The method of claim 1, wherein at least one debug gate is associated with at a transactional flow management interrupt control system.

6. The method of claim 1, wherein at least one of said monitorings are associated with at least one of a matching capability or a masking capability.

7. The method of claim 1, wherein said interrupting is associated with at least one of a control flow or a data flow.

8. The method of claim 1, wherein at least one processing system is associated with at least one of: (i) a central processing unit, (ii) a system bus-to-memory hub, (iii) a graphic processing unit, (iv) a display processing unit, (v) an image enhancer, or (vi) a memory unit.

9. The method of claim 1, further comprising:
determining whether said interrupting should be perform before or after a match detected via at least one debug gate.

10. The method of claim 1, wherein at least one debug gate is associated with an agent bridge port.

11. The method of claim 1, wherein at least one debug gate is associated with a multi-port, multi-channel memory controller.

12. The method of claim 1, wherein at least one of said monitorings is associated with a double gate control mechanism for data flow.

13. The method of claim 1, wherein at least one of said monitorings is associated with a transaction counter control for a transaction flow.

14. An apparatus, comprising:
a first processing unit;
a second processing unit;
a third processing unit;
a first bus to exchange information between the first and second processing units, the first bus operating in accordance with a first bus protocol;
a second bus to exchange information between the second and third processing units, the second bus operating in accordance with a second bus protocol;
a first transactional flow management interrupt gate between the first processing unit and the first bus; and
a second transactional flow management interrupt gate between the second processing unit and the second bus, wherein at least one of the first or second transactional flow management interrupt gates is associated with a double gate control mechanism for data flow.

15. The apparatus of claim 14, wherein the first transactional flow management interrupt gate includes:
an address matching register, and
an address masking register.

16. The apparatus of claim 14, wherein the first transactional flow management interrupt gate includes a data injection mechanism.

17. An apparatus comprising:
a computer-readable storage medium having stored thereon instructions that when executed by a machine result in the following:
monitoring, via a first transactional flow management interrupt debug point, a first bus to exchange data between a first processing system and a second processing system;
monitoring, via a second transactional flow management interrupt debug point, a second bus to exchange data between the second processing system and a third processing system, wherein at least one of said monitorings is associated with a transaction counter control for a transaction flow; and
responsive to said monitoring of at least one of the first or second buses, interrupting execution of applications executing on at least two of the processing units.

18. The apparatus of claim 17, wherein at least two of the processing units are associated with a single system on a chip.

19. The apparatus of claim 18, wherein said system on a chip is associated with at least one of: (i) a digital display device, (ii) a television, (iii) a digital video recorder, (iv) a game device, (v) a personal computer, (vi) a wireless device, or (vii) a set-top box.

20. A system, comprising:
a general processing unit;
a graphics processing unit;
a memory cross-bar control unit;
a first bus to exchange information between the general processing unit and the graphics processing unit, the first bus operating in accordance with a first bus protocol;
a second bus to exchange information between the graphics processing unit and the memory cross-bar control unit, the second bus operating in accordance with a second bus protocol;
a first transactional flow management interrupt gate between the general processing unit and the first bus;
a second transactional flow management interrupt gate between the second bus and the memory cross-bar control, wherein at least one of the first or second transactional flow management interrupt gates is associated with a double gate control mechanism for data flow; and
a digital output to provide a digital signal, associated with image information processing via the graphics processing unit, to a digital display device.

21. The system of claim 20, wherein the system is associated with at least one of: (i) a digital display device, (ii) a television, (iii) a digital video recorder, (iv) a game device, (v) a personal computer, (vi) a wireless device, or (vii) a set-top box.

* * * * *